(12) United States Patent
Pahle et al.

(10) Patent No.: US 9,097,301 B2
(45) Date of Patent: Aug. 4, 2015

(54) DISC BRAKE

(71) Applicant: KNORR-BREMSE Systeme fuer Nutzfahrzeuge GmbH, Munich (DE)

(72) Inventors: Wolfgang Pahle, Bad Weissee (DE); Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 15 days.

(21) Appl. No.: 13/725,793

(22) Filed: Dec. 21, 2012

(65) Prior Publication Data

US 2013/0105252 A1    May 2, 2013

Related U.S. Application Data

(63) Continuation of application No. PCT/EP2011/059791, filed on Jun. 14, 2011.

(30) Foreign Application Priority Data

Jun. 24, 2010   (DE) .......................... 10 2010 024 944

(51) Int. Cl.
  *F16D 65/00* (2006.01)
  *F16D 65/18* (2006.01)
  *F16D 55/22* (2006.01)

(52) U.S. Cl.
  CPC ............ *F16D 65/0031* (2013.01); *F16D 55/22* (2013.01); *F16D 65/18* (2013.01)

(58) Field of Classification Search
  CPC . F16D 65/0031; F16D 65/847; F16D 65/853; F16D 65/827; B60S 1/62
  USPC ................. 188/264 R, 264 A, 264 AA, 264 P
  See application file for complete search history.

(56) References Cited

U.S. PATENT DOCUMENTS

| | | | | |
|---|---|---|---|---|
| 1,905,657 | A | * | 4/1933 | Tarbox ...................... 188/264 R |
| 2,091,865 | A | * | 8/1937 | Leveen ......................... 188/2 R |
| 2,597,603 | A | * | 5/1952 | Tack .......................... 188/264 A |

(Continued)

FOREIGN PATENT DOCUMENTS

| | | | | |
|---|---|---|---|---|
| DE | 4233276 | A1 * | 4/1994 | ................ B60T 5/00 |
| DE | 4240873 | A1 * | 6/1994 | .............. B60T 17/00 |

(Continued)

OTHER PUBLICATIONS

International Preliminary Report on Patentability (PCT/IB/338 & PCT/IB/373), including Written Opinion (PCT/ISA/237) dated Jan. 10, 2012 (seven (7) pages).
International Search Report dated Aug. 11, 2011 including English-language translation Four (4) pages).

*Primary Examiner* — Bradley King
*Assistant Examiner* — Stephen Bowes
(74) *Attorney, Agent, or Firm* — Crowell & Moring LLP

(57) ABSTRACT

A disc brake, having a brake caliper which straddles over a brake disc and in which brake pads are arranged which are provided with friction linings and can be pressed in each case with their friction lining on both sides against friction rings of the brake disc. The disc brake is configured such that the friction rings are covered outside an overlap region of the friction linings by a housing which is stationary with respect to the brake caliper and is connected to a suction device. A dust removal device is provided between the housing and the suction device.

10 Claims, 4 Drawing Sheets

(56) References Cited

U.S. PATENT DOCUMENTS

| | | | | |
|---|---|---|---|---|
| 2,746,577 | A | * | 5/1956 | Butler ..................... 188/264 A |
| 2,903,099 | A | * | 9/1959 | Nelson ......................... 188/75 |
| 2,927,822 | A | * | 3/1960 | Karl Rabe .................... 301/6.3 |
| 3,366,203 | A | * | 1/1968 | Dean ....................... 188/264 A |
| 4,440,270 | A | * | 4/1984 | Ross ..................... 188/264 AA |
| 5,035,304 | A | * | 7/1991 | Bosch ....................... 188/71.1 |
| 5,162,053 | A | * | 11/1992 | Kowalski, Jr. .............. 55/385.3 |
| 2008/0029357 | A1 | * | 2/2008 | Krantz ..................... 188/218 A |
| 2009/0265880 | A1 | | 10/2009 | Jessberger |
| 2010/0096226 | A1 | * | 4/2010 | Gelb ..................... 188/264 AA |

FOREIGN PATENT DOCUMENTS

| | | | | |
|---|---|---|---|---|
| DE | 20 2007 000 246 | U1 | | 6/2008 |
| DE | 10 2008 029 504 | A1 | | 12/2009 |
| GB | 818474 | A | * 8/1959 | ............... B61H 5/00 |
| JP | 04031154 | A | * 2/1992 | ................ B60T 5/00 |
| JP | 05060158 | A | * 3/1993 | ............ F16D 65/847 |
| WO | WO 2008/083884 | A1 | | 7/2008 |

\* cited by examiner

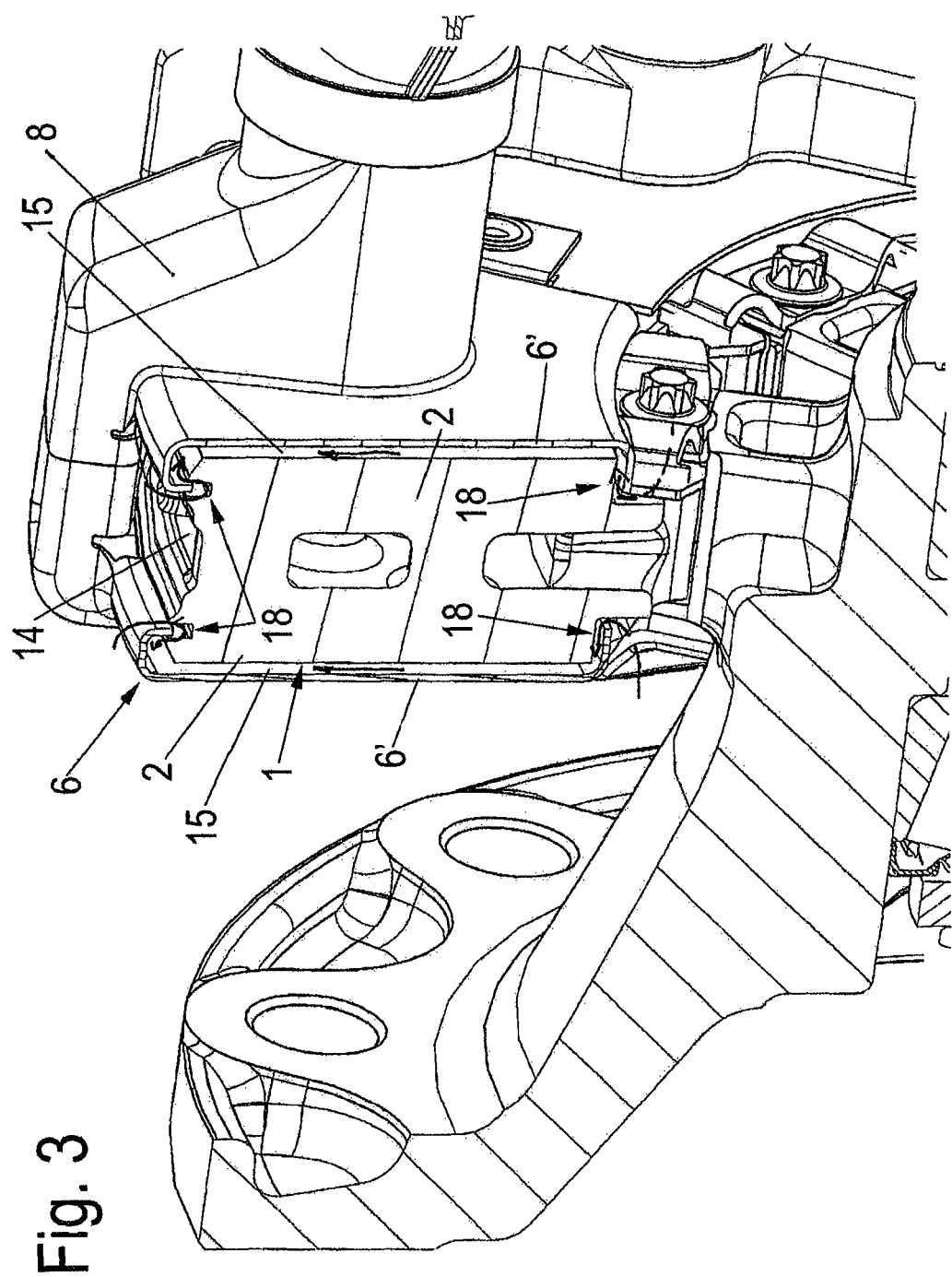

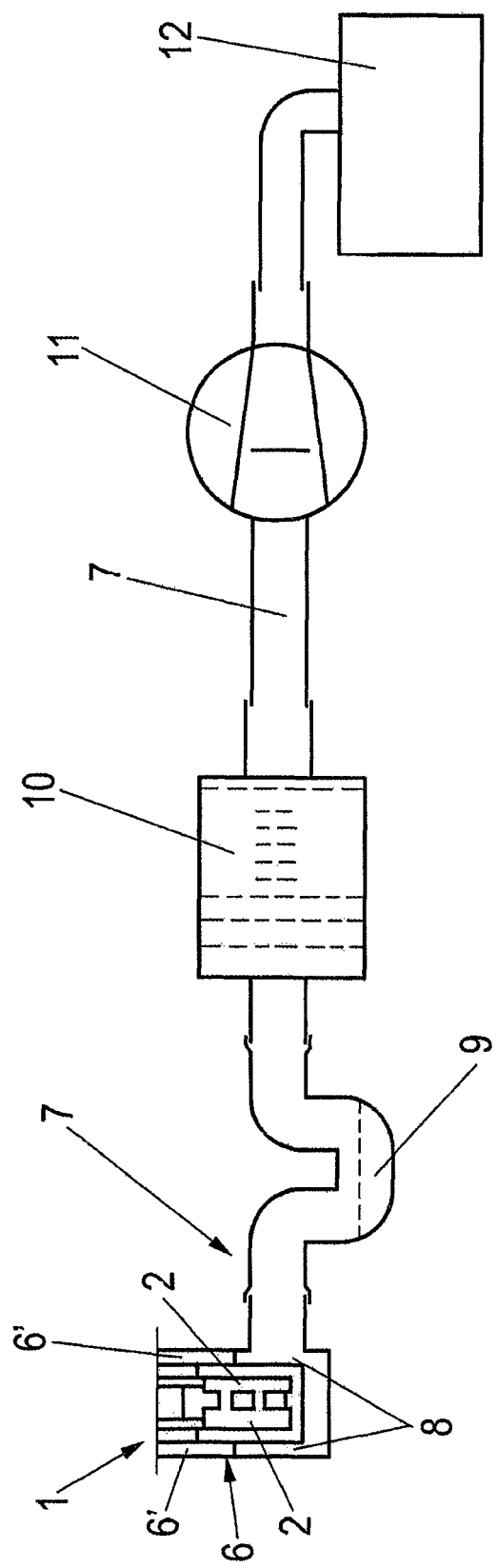

DISC BRAKE

CROSS-REFERENCE TO RELATED APPLICATIONS

This application is a continuation of PCT International Application No. PCT/EP2011/059791, filed Jun. 14, 2011, which claims priority under 35 U.S.C. §119 from German Patent Application No. DE 10 2010 024 944.0, filed Jun. 24, 2010, the entire disclosures of which are herein expressly incorporated by reference.

BACKGROUND AND SUMMARY OF THE INVENTION

The invention relates to a disc brake having a brake caliper, which straddles a brake disc and in which brake pads are arranged having friction linings. The brake pads can be pressed, in each case, on both sides against friction rings of the brake disc.

In connection with attempts, for reasons of environmental protection, to reduce fine dust loading of the air, there are also demands for the prevention of brake dust emissions.

Owing, in particular, to the small particle size and the content of metallic constituents, the abraded material that is formed during braking from the friction lining and the brake disc is increasingly being viewed critically.

Various attempted solutions are known in this regard in the prior art, these being divided essentially into brake-dust collecting and brake-dust filtering devices. However, the known designs do not meet the requirements set to a satisfactory extent.

Brake-dust collectors, which are usually designed as gravity separators, are not suitable for avoiding fine dust emissions since only relatively coarse particles are caught and removed by gravity. At particle sizes <10 µm, gravity separation is no longer possible.

Brake-dust filtering devices, on the other hand, can retain even very fine dust particles, given an appropriate choice of filter material.

WO 2008/083884 A1 discloses the use of a brake-dust filtering device of this kind which has a fine-dust filter on one side of the brake disc of a disc brake and a fan on the other side, both being positioned in a wheel rim. The fine-dust filter is held on the rim in a manner hermetically sealed-off from the environment.

To ensure a through flow of the abraded material which arises during braking, air is sucked in through the rim by the fan and, taking the abraded material along with it, is passed through the fine-dust filter, where dust particles are filtered out.

Since the brake disc is to this extent closed off by the fine-dust filter on one side and by the fan on the other, the necessary cooling of the composite lining disc brake is achieved exclusively by means of the air introduced by the fan.

The flow rates necessary for adequate heat dissipation require that the filtering device should be of significant dimensions, but the available quantities of cooling air are, in many cases, still insufficient. This is associated with increased braking temperatures and with an increase in brake wear resulting therefrom. Particularly as regards operating costs, the known device is therefore not conducive to optimized use.

A similar view must also be taken of the fact that dirt is also sucked in from the environment with the cooling air, with the result that the fine-dust filter has only a relatively short service life. A fine-dust filter of this kind must therefore be replaced at very short intervals.

It is the underlying object of the invention to develop a disc brake such that the material abraded during braking is prevented from escaping into the environment, while operating costs are minimized.

This and other objects are achieved by a disc brake having a brake caliper, which straddles a brake disc and in which brake pads are arranged having friction linings. The brake pads can be pressed, in each case, on both sides against friction rings of the brake disc. The friction rings are covered by a housing outside the region where the friction rings overlap with the friction linings. The housing is stationary with respect to the brake caliper and is connected to a suction device, wherein a dust removal device is provided between the housing and the suction device.

By means of this design embodiment, virtual encapsulation of the friction rings of the brake disc is achieved, covering both the useful surface, i.e. the friction surface, and the peripheral surface defined by the thickness of the friction rings.

In this arrangement, the peripheral covering surface forms a circular collar, with a similar collar also being provided on the inner circumference, and the housing according to the invention thus forms a hood which is open only in the region of overlap of the friction lining of the brake pad.

The covering surfaces of the housing, which is stationary with respect to the brake caliper and is attached thereto or to a fixed-location brake carrier, is positioned with a slight clearance relative to the covered regions.

At the inner and outer circumference, the housing is designed as a gap seal, e.g. as a labyrinth seal, which allows fresh air to be sucked in during the operation of the suction device, taking along the abraded material that arises during braking.

The covering parts that cover the friction rings present on both sides of the brake disc can be connected to one another by connecting tabs, wherein the connecting tabs are arranged spaced apart, giving rise to sufficiently large free zones, through which unhindered cooling by air exchange remains assured in the case of an internally ventilated brake disc.

It is expedient if each housing consists of two parts in the form of semicircular segments, which are connected to one another by screw connection, for example, allowing very easy assembly and disassembly.

A suction line, which is connected to the suction device, opens into the gap volume formed between the housing and the associated friction ring, wherein a common suction line is provided for both housings.

The dust removal device arranged between the suction device and the housing preferably consists of a coarse-dust separator, which is arranged upstream in the direction of the housing, and a fine-dust filter. The contaminated extracted air is guided through the coarse-dust separator toward the fine-dust filter, which is connected ahead of the suction device, preferably a suction fan. A muffler is provided downstream of the suction fan, through which muffler the air which has been cleaned to this extent is released into the atmosphere.

It is expedient if the suction device is switched by way of a switching unit, which is coupled to the braking device and is controlled in such a way that the suction device remains in operation for a certain time, even after braking has ended. In free, unbraked travel and after the predetermined after-running time, extraction is unnecessary. It is thus possible, with relatively small extraction air rates, to achieve effective filtering that is distinguished especially by low operating costs.

Another contributing factor to this is the fact that the arrangement of the coarse-dust separator ahead of the fine-dust filter means that the latter is subjected to significantly lower loading than was previously the case, in particular because the gap seals mentioned between the friction rings or the brake linings and the housing ensure that no extraneous dirt but only ambient air, i.e. fresh air as it were, is sucked in.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a fragmentary view of the disc brake, likewise shown diagrammatically; and FIG. 4 shows part of the disc brake with connected additional units in a schematically represented view.

DETAILED DESCRIPTION OF THE DRAWINGS

Figure 1:
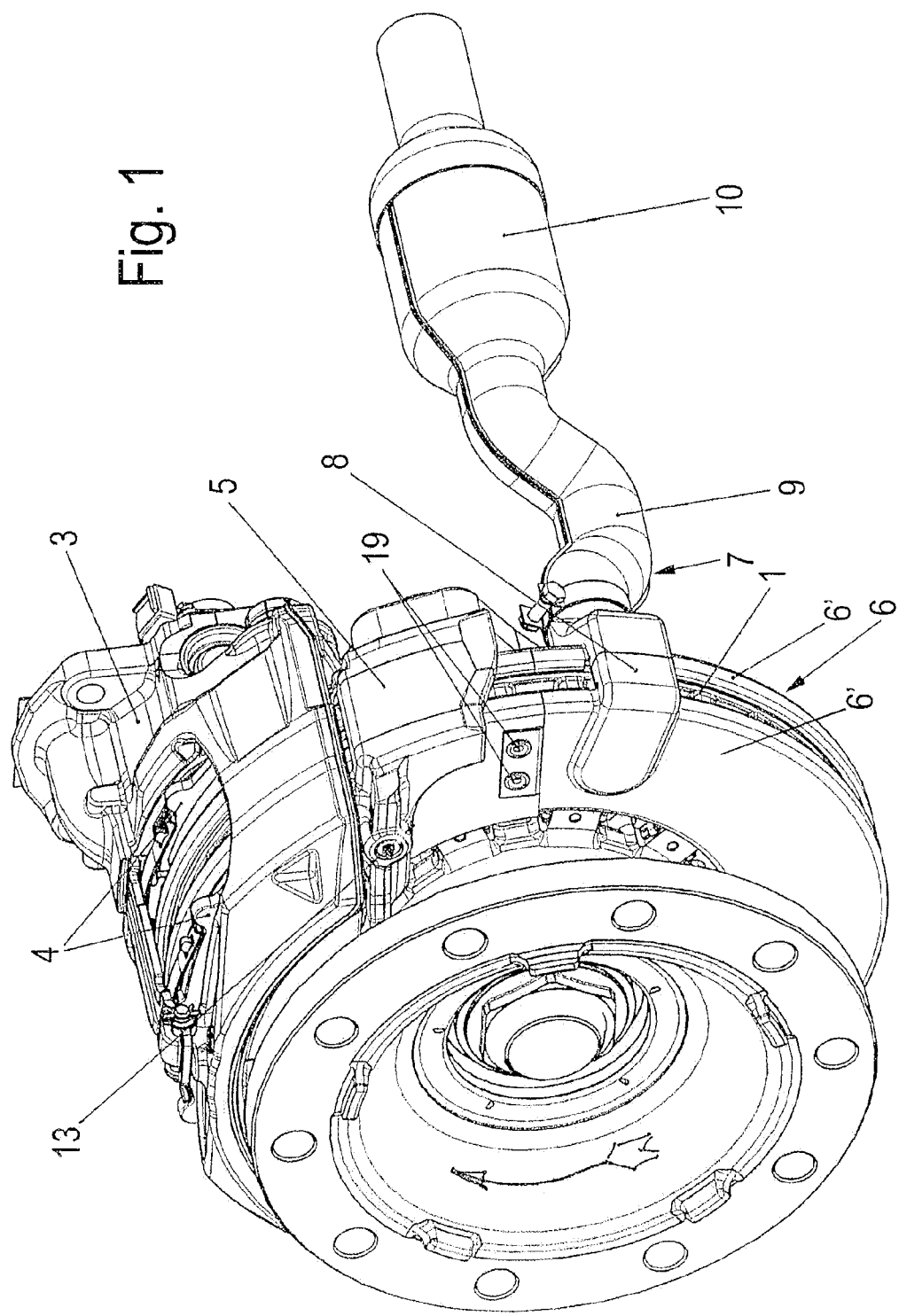
FIG. 1 is a perspective front view of an exemplary a disc brake according to the invention.

FIG. 1 shows a disc brake, having a brake caliper 3, which straddles over a brake disc 1 and in which brake pads 4 provided with friction linings (not visible) are arranged. The brake pads can be pressed in each case with their friction lining on both sides against friction rings 2 (FIG. 3) of the brake disc 1.

According to an embodiment of the invention, the friction rings 2 are covered by a hood-type housing 6, which is stationary relative to the brake caliper 3 and which consists of two covering parts 6'.

In the example shown, the brake disc 1 is of an internally ventilated design with cooling ducts 14, wherein the covering parts 6', each covering one friction ring 2, are connected to one another by connecting tabs 16 arranged spaced apart about the periphery of the covering parts 6'.

Figure 2:
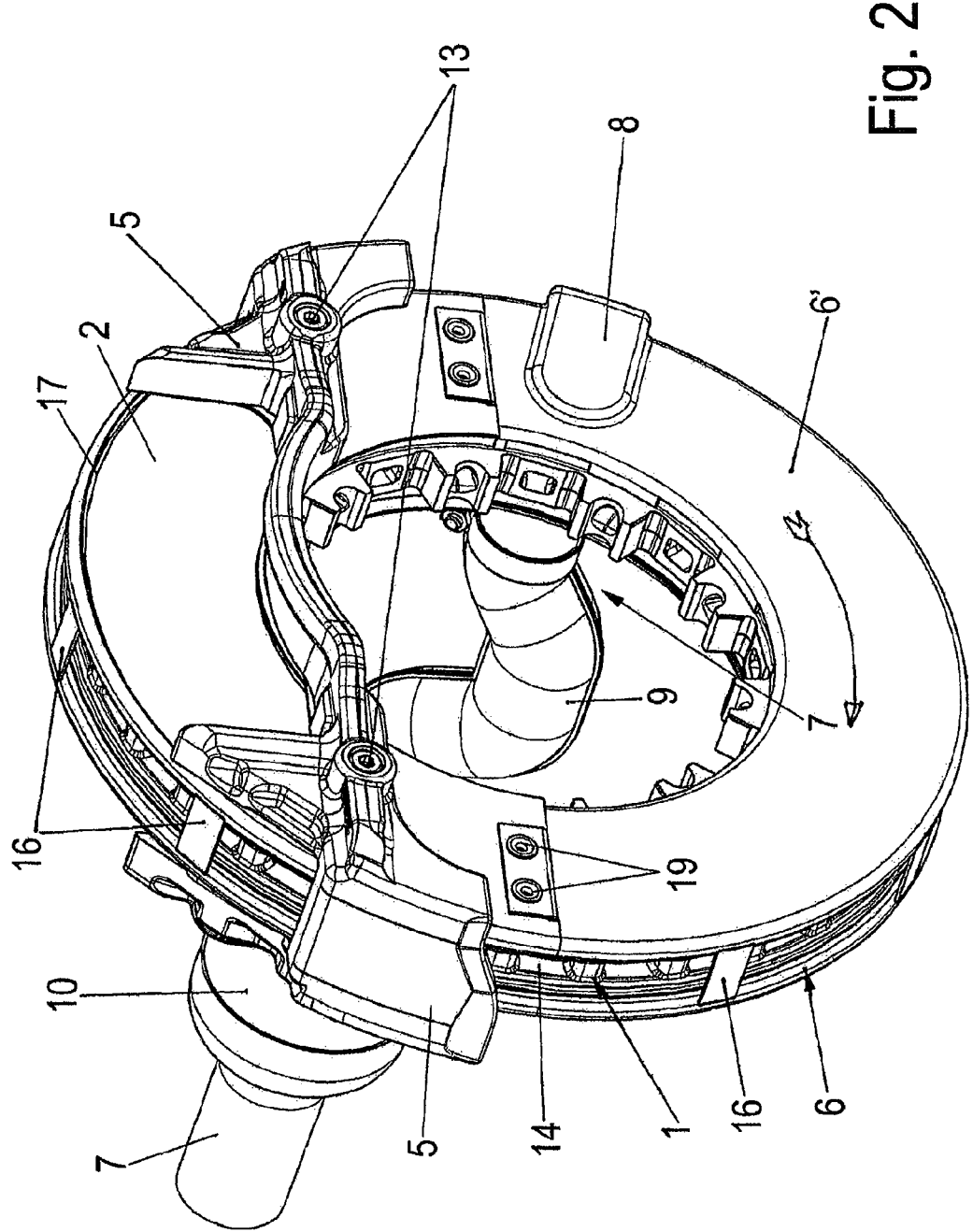
FIG. 2 shows part of the disc brake in a perspective rear view.

As is shown very clearly in FIG. 2, in particular, in which the disc brake is shown from the mounting side without the brake caliper 3, there is an aperture in the housing 6 in the projected region of overlap of the friction lining of the brake pad 4, for which purpose a cutout 17 is introduced into the associated covering part 6'. However, a region of the covering part 6' defined by the thickness of the respective friction ring is made largely continuous, both at the outer circumference of the friction ring 2 and at the inner circumference thereof.

In these regions, the two covering parts 6' are designed as gap seals 18, which extend into a gap volume 15 formed by a slight clearance between the friction surface of the friction ring 2 and the facing side of the covering parts 6'.

A suction connection 8 is connected to the two covering parts 6', opening into the associated gap volume 15 and merging into a suction line 7. The suction line 7 is connected further along to a suction device in the form of a suction fan 11.

Arranged between the suction fan 11 and the housing 6 is a dust removal device, which, starting from the suction connection 8, consists of a coarse-dust separator 9 and a fine-dust filter 10 arranged downstream in the suction direction.

The air sucked in by the suction fan 11 via the gap seals 18 and the gap volumes 15 carries the abraded material that arises during a braking operation toward the dust removal device. The, as it were unladen, air emerging from the fine-dust filter 10 is discharged into the environment via a muffler 12 arranged downstream of the suction fan 11.

The two covering parts 6', each assigned to one friction ring 2, are connected to the brake carrier 5 by fastening screws 13.

To allow easier mounting of the housing 6, the latter is divided, giving two semicircular housing parts, which are connected to one another by connecting screws 19.

The gap seals 18, which can be designed as labyrinth seals, for example, are designed to match the installation conditions and tolerances and to take account of the thermal expansion of the brake disc 1.

The dimensional coordination of the sealing gaps and of the gap volumes is determined by the necessary extraction air flow since this must be made sufficiently large to prevent escape of brake dust and any smoke that may be formed into the environment with the suction effect that arises.

LISTS OF REFERENCE NUMERALS 1 brake disc
2 friction ring
3 brake caliper
4 brake shoe
5 brake carrier
6 housing
6' covering part
7 suction line
8 suction connection
9 coarse-dust separator
10 fine-dust filter
11 suction fan
12 muffler
13 fastening screw
14 cooling duct
15 gap volume
16 connecting tab
17 cutout
18 gap seal
19 connecting screw The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake having a brake caliper that straddles an internally-ventilated brake disc with brake pads having friction linings pressable against respective spaced apart friction rings of the brake disc, the disc brake comprising:
 a housing operatively configured to cover entire friction surface faces of the friction rings of the brake disc outside regions where the friction linings of the brake pads overlap with the friction rings of the brake disc, the housing being;
 stationarily arranged with respect to the caliper,
 open at an outer circumference of the brake disc in a region away from the brake caliper and between the friction rings through which the brake disc is internally-ventilated, and
 configured at a radially-outward edge and at a radially-inward edge of each friction ring to form a non-contact labyrinth gap seal arranged to exclude debris from surrounding environment air from entering a gap volume between the housing and the friction surface faces;

a suction device operatively connected to the housing; and a dust removal device operatively arranged between the housing and the suction device.

2. The disc brake according to claim 1, wherein the housing has a two-part design formed of half-rings, the half-rings being connected to one another via fasteners.

3. The disc brake according to claim 1, wherein the housing is operatively secured on a brake carrier for the caliper at a fixed-location.

4. The disc brake according to claim 1, wherein the housing comprises two covering parts, each covering part being respectively assigned to one of the friction rings.

5. The disc brake according to claim 4, wherein the two covering parts are connected to one another via connecting tabs, the connecting tabs being spaced apart from one another.

6. The disc brake according to claim 1, wherein a suction line is joined to the housing and connected to the suction device, the suction line opening into the gap volume.

7. The disc brake according to claim 1, wherein the dust removal device comprises a coarse-dust separator and a fine-dust filter.

8. The disc brake according to claim 7, wherein the fine-dust filter is arranged downstream of the coarse-dust separator in a suction direction.

9. The disc brake according to claim 1, wherein the suction device is a suction fan.

10. The disc brake according to claim 9, further comprising a muffler, wherein air cleaned in the dust removal device is passed through the muffler adjoining the suction fan.

\* \* \* \* \*